US008571099B2

(12) United States Patent
Kerofsky et al.

(10) Patent No.: US 8,571,099 B2
(45) Date of Patent: *Oct. 29, 2013

(54) DECODER WITH DYNAMIC RANGE COMPENSATION

(75) Inventors: Louis Joseph Kerofsky, Camas, WA (US); Christopher A. Segall, Camas, WA (US); Kiran Misra, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 123 days.

This patent is subject to a terminal disclaimer.

(21) Appl. No.: 13/283,430

(22) Filed: Oct. 27, 2011

(65) Prior Publication Data
US 2012/0307891 A1 Dec. 6, 2012

Related U.S. Application Data

(63) Continuation-in-part of application No. 13/150,541, filed on Jun. 1, 2011.

(51) Int. Cl.
*H04N 7/12* (2006.01)
(52) U.S. Cl.
USPC .................................................. 375/240.03
(58) Field of Classification Search
USPC ......................................................... 375/240
See application file for complete search history.

(56) References Cited

U.S. PATENT DOCUMENTS

| | | | |
|---|---|---|---|
| 7,106,797 B2* | 9/2006 | Malvar | 375/240.03 |
| 7,230,986 B2* | 6/2007 | Wise et al. | 375/240.26 |
| 7,711,938 B2* | 5/2010 | Wise et al. | 712/300 |
| 7,778,813 B2* | 8/2010 | Zhou | 703/15 |
| 2003/0123553 A1* | 7/2003 | Kerofsky | 375/240.25 |
| 2005/0083216 A1* | 4/2005 | Li | 341/50 |
| 2005/0243938 A1* | 11/2005 | Armstrong et al. | 375/260 |
| 2007/0058713 A1* | 3/2007 | Shen et al. | 375/240.2 |
| 2007/0058718 A1* | 3/2007 | Shen et al. | 375/240.12 |
| 2011/0090961 A1* | 4/2011 | Fong et al. | 375/240.15 |
| 2012/0183045 A1* | 7/2012 | Kerofsky et al. | 375/240.03 |
| 2012/0230415 A1* | 9/2012 | Winger et al. | 375/240.16 |

OTHER PUBLICATIONS

JCT-VC "Draft Test Model under Consideration,"JCTVC-A205, 1. JCT-VC Meeting, Dresden, Apr. 2010, 30 pgs.
"Part 10: Advanced Video Coding." ISO publication: ISO/IEC 14496-10:2005—Information technology—Coding of audio-visual objects, Mar. 2010, 60 pgs., Part1.
"Part 10: Advanced Video Coding." ISO publication: ISO/IEC 14496-10:2005—Information technology—Coding of audio-visual objects, Mar. 2010, 60 pgs., Part2.

(Continued)

*Primary Examiner* — Joseph Ustaris
*Assistant Examiner* — Talha Nawaz
(74) *Attorney, Agent, or Firm* — Chernoff Vilhauer McClung & Stenzel, LLP

(57) ABSTRACT

A system for decoding video including receiving quantized coefficients representative of a block of video representative of a plurality of pixels and dequantizing the quantized coefficients. The system inverse transform the dequantized coefficients using a first one dimensional inverse transform and a second one dimensional inverse transform to determine a decoded residue where the result of the first one-dimensional inverse transform are shifted different amounts using a shifting process based upon the magnitude of the dequantized coefficients.

7 Claims, 16 Drawing Sheets

(56) References Cited

OTHER PUBLICATIONS

"Part 10: Advanced Video Coding." ISO publication: ISO/IEC 14496-10:2005—Information technology—Coding of audio-visual objects, Mar. 2010, 60 pgs., Part3.

"Part 10: Advanced Video Coding." ISO publication: ISO/IEC 14496-10:2005—Information technology—Coding of audio-visual objects, Mar. 2010, 60 pgs., Part4.

"Part 10: Advanced Video Coding." ISO publication: ISO/IEC 14496-10:2005—Information technology—Coding of audio-visual objects, Mar. 2010, 60 pgs., Part5.

"Part 10: Advanced Video Coding." ISO publication: ISO/IEC 14496-10:2005—Information technology—Coding of audio-visual objects, Mar. 2010, 60 pgs., Part6.

"Part 10: Advanced Video Coding." ISO publication: ISO/IEC 14496-10:2005—Information technology—Coding of audio-visual objects, Mar. 2010, 60 pgs., Part7.

"Part 10: Advanced Video Coding." ISO publication: ISO/IEC 14496-10:2005—Information technology—Coding of audio-visual objects, Mar. 2010, 60 pgs., Part8.

"Part 10: Advanced Video Coding." ISO publication: ISO/IEC 14496-10:2005—Information technology—Coding of audio-visual objects, Mar. 2010, 60 pgs., Part9.

"Part 10: Advanced Video Coding." ISO publication: ISO/IEC 14496-10:2005—Information technology—Coding of audio-visual objects, Mar. 2010, 60 pgs., Part10.

"Part 10: Advanced Video Coding." ISO publication: ISO/IEC 14496-10:2005—Information technology—Coding of audio-visual objects, Mar. 2010, 60 pgs., Part11.

"Part 10: Advanced Video Coding." ISO publication: ISO/IEC 14496-10:2005—Information technology—Coding of audio-visual objects, Mar. 2010, 14 pgs., Part12.

Bossen "Common test conditions and software reference configurations," JCTVC-O500, 3rd Meeting: Guangzhou, CN, Oct. 7-15, 2010, 4 pgs.

On transform dynamic range, JCT-D071, JCT-VC Meeting: Daegu, Korea, Jan. 2011, 5 pgs.

* cited by examiner

DECODER WITH DYNAMIC RANGE COMPENSATION

CROSS-REFERENCE TO RELATED APPLICATIONS

This application is a continuation-in-part of U.S. patent application Ser. No. 13/150,541, filed Jun. 1, 2011.

BACKGROUND OF THE INVENTION

The present invention relates to image decoding with dynamic range adjustments.

Existing video coding standards, such as H.264/AVC, generally provide relatively high coding efficiency at the expense of increased computational complexity. As the computational complexity increases, the encoding and/or decoding speeds tend to decrease. Also, the desire for increased higher fidelity tends to increase over time which tends to require increasingly larger memory requirements, increasingly larger memory bandwidth requirements, and increasing hardware complexity. The increasing memory requirements and the increasing memory bandwidth requirements tends to result in increasingly more expensive and computationally complex circuitry, especially in the case of embedded systems.

Referring to FIG. 1, many decoders (and encoders) receive (and encoders provide) encoded data for blocks of an image. Typically, the image is divided into blocks and each of the blocks is encoded in some manner, such as using a discrete cosine transform (DCT), and provided to the decoder. The decoder receives the encoded blocks and decodes each of the blocks in some manner, such as using an inverse discrete cosine transform. In many cases, the decoding of the image coefficients of the image block is accomplished by matrix multiplication. The matrix multiplication may be performed for a horizontal direction and the matrix multiplication may be performed for a vertical direction. By way of example, for 8-bit values, the first matrix multiplication can result in 16-bit values, and the second matrix multiplication can result in 24-bit values in some cases. In addition, the encoding of each block of the image is typically quantized, which maps the values of the encoding to a smaller set of quantized coefficients. Quantization requires de-quantization by the decoder, which maps the set of quantized coefficients to approximate encoding values or de-quantized coefficients. The number of desirable bits for de-quantized coefficients is a design parameter. The potential for large de-quantized coefficient values resulting from the matrix multiplication and the de-quantization operation is problematic for resource constrained systems, especially embedded systems.

The foregoing and other objectives, features, and advantages of the invention will be more readily understood upon consideration of the following detailed description of the invention, taken in conjunction with the accompanying drawings.

DETAILED DESCRIPTION OF PREFERRED EMBODIMENT

Figure 1:
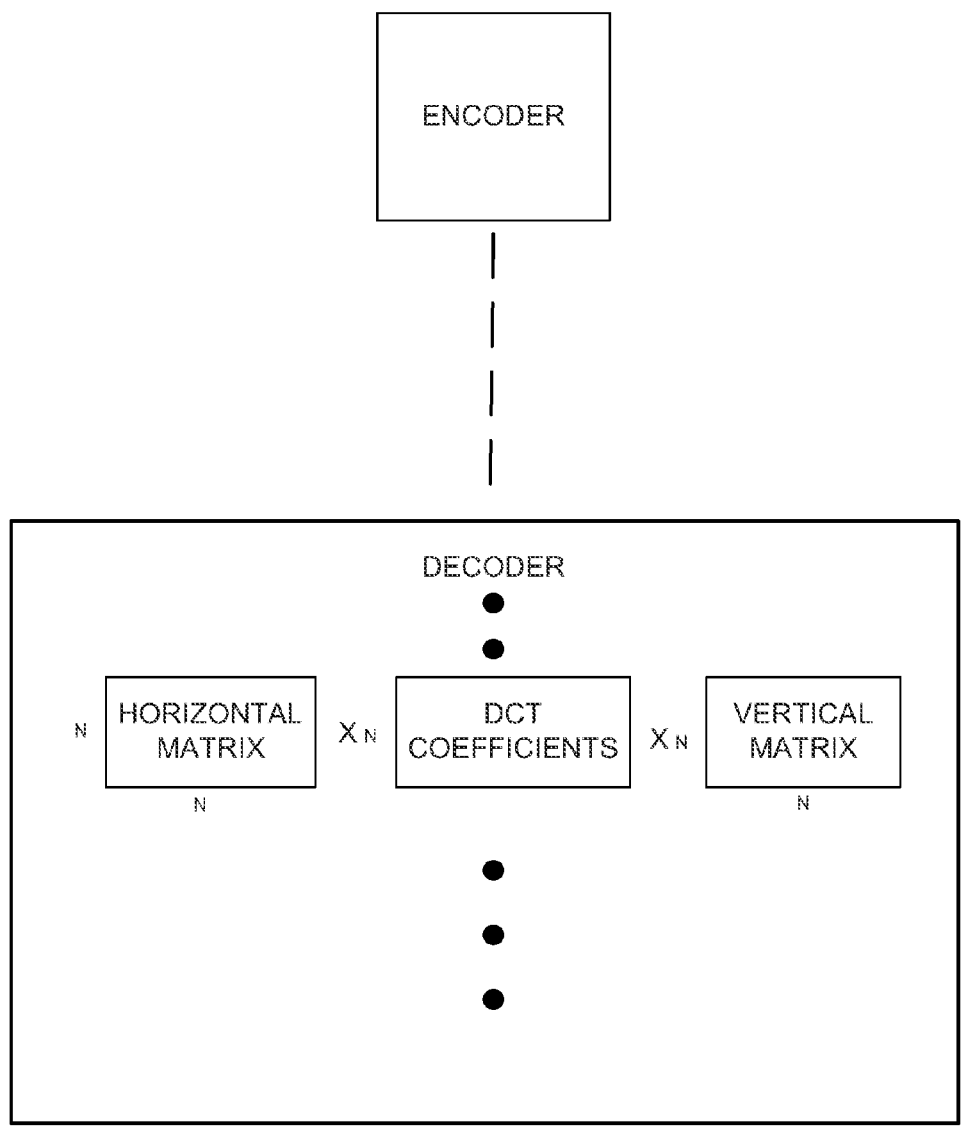
FIG. 1 illustrates an encoder and a decoder.
Figure 2:
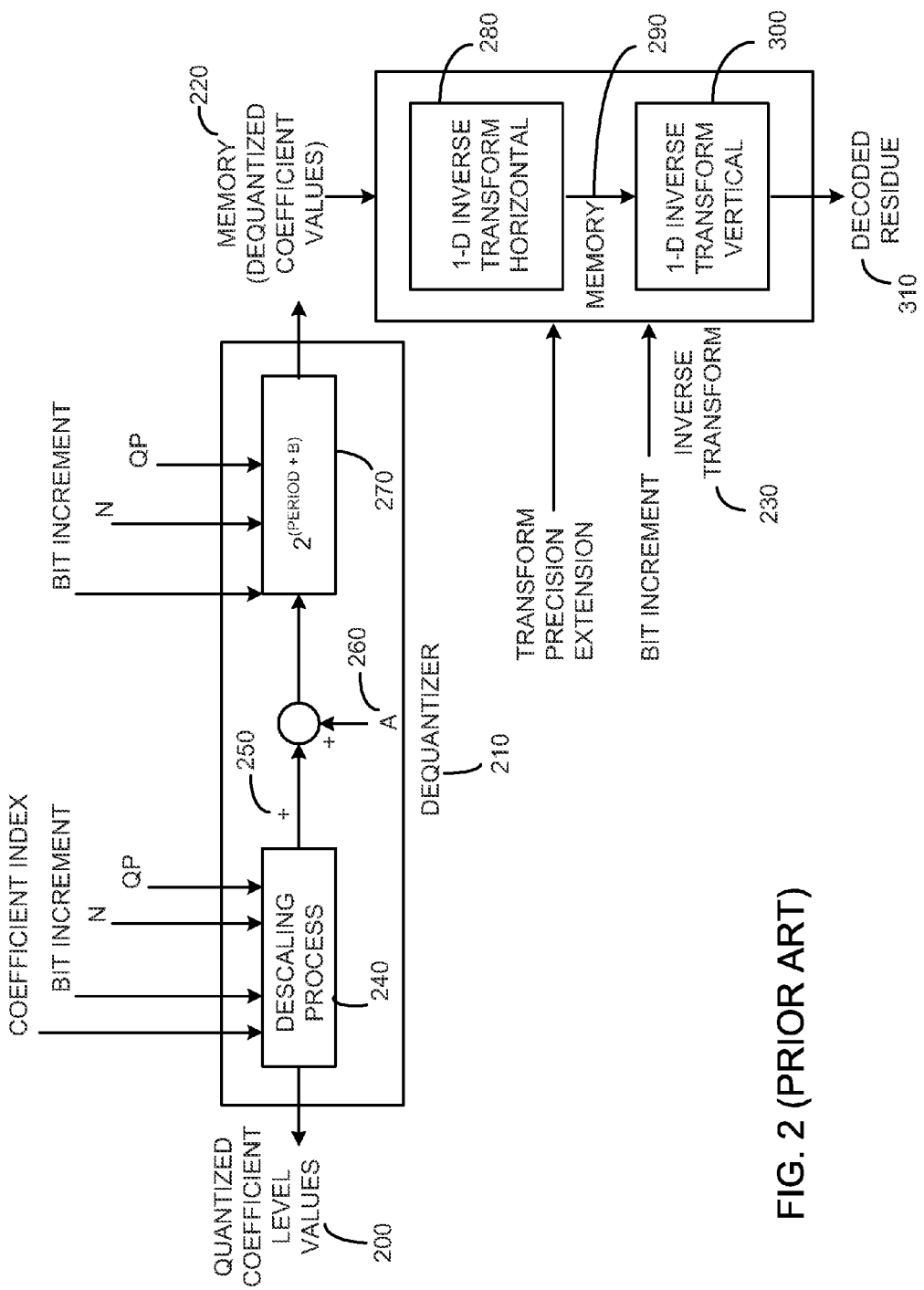
FIG. 2 illustrates a decoder with a dequantizer and an inverse transform.

Referring to FIG. 2 (prior art), a decoder for the de-quantization and inverse transform of the received quantized coefficient level values from the encoder for a block of the image is illustrated, in relevant part. The decoder receives the quantized coefficient level values 200 at a de-quantizer 210. The de-quantized coefficient values resulting from the de-quantizer 210 are stored in memory 220. The de-quantized coefficient values stored in memory 220 are then processed by a pair of inverse transforms 230 to determine a decoded residue 310. The pair of inverse transforms 230 map data from a transform domain to a spatial domain using a matrix multiplication operator or other suitable process. The de-quantized coefficient values 220 and the quantized coefficient level values 200 may be the same, if desired.

The de-quantizer 210 includes a descaling process 240. The descaling process 240 maps quantized coefficient level values 200 that are transmitted in the bitstream. The descaling process corresponds to multiplying quantized coefficient level values with one integer number dependent on quantization parameter (QP), coefficient index, and transform size (N). An example of the descaling process 240 may include Level*IntegerValue (Remainder, coefficient index)*16 for a de-quantizer used prior to an 8×8 inverse transform and Level*IntegerValue (Remainder, coefficient index) for a de-quantizer used prior to other transform sizes, where Level denotes the quantized coefficient level value, IntegerValue is a function that produces an integer number. The descaling process 240 is preferably based upon a function of a remainder, transform size, and/or a coefficient index (e.g., position), to determine an intermediate set of values 250. The remainder is the sum of the quantization parameter (QP)+ P*BitIncrement modulo P ((QP+P*BitIncrement)% P). Modulo as defined in the H.264/AVC standard is defined as: x % y, as remainder of x divided by y, defined only for integers x and y with x>=0 and y>0. In one embodiment P may take on the value 6. An adjustment mechanism A 260 may be applied to the values 250, which may be a variable dependent on transform size and/or a function of a received Period. The period is the sum of the quantization parameter (QP)+ P*BitIncrement divided by P ((QP+P*BitIncrement)/P), where "BitIncrement" is the bit depth increment. The "/" as defined in the H.264/AVC standard is defined as: integer division with truncation of the result towards zero. For example, 7/4 and −7/−4 are truncated to 1 and −7/4 and 7/−4 are truncated to −1. In one embodiment P may take on the value 6. The resulting values 250, possibly further modified by mechanism A 260, may be further modified by a factor of $2^{(Period+B)}$ 270. B is a variable that is dependent on the transform size. The results of the modification 270 are de-quantized coefficient values and stored in the memory 220. The inverse transform 230 may perform a 1-dimensional inverse horizontal transform 280, which is stored in memory 290. The inverse transform 230 may also perform a 1-dimensional inverse vertical transform 300, which results in the decoded residue 310. The transforms 280 and 300 may be swapped with each other, as desired.

The memory bandwidth of the memory 220 of the video decoder illustrated in FIG. 2, when implemented within the "Part 10: Advanced Video Coding", ISO publication: ISO/IEC 14496-10:2005—Information Technology—Coding Of Audio-Visual Objects (incorporated by reference herein) (H.264/AVC standard), may be limited by using a constraint. For example, in section 8.5.10 of the H.264/AVC standard, the width of the memory access for 4×4 luma DC transform coefficients is limited by including the following statements: "The bitstream shall not contain data that result in any element $f_{ij}$ of f with i, j=0.3 that exceeds the range of integer values from $-2^{(7+bitDepth)}$ to $2^{(7+bitDepth)}-1$, inclusive" and "The bitstream shall not contain data that result in any element $deY_{ij}$ of dcY with i,j=0.3 that exceeds the range of integer values from $-2^{(7+bitDepth)}$ to $2^{(7+bitDepth)}-1$, inclusive." The H.264/AVC standard includes similar memory limitations for other transform sizes. In addition to including a complex memory bandwidth limitation, the H.264/AVC standard includes no mechanism to ensure that this limitation is enforced. Similarly, the JCT-VC, "Draft Test Model Under Consideration", JCTVC-A205, JCT-VC Meeting, Dresden, April 2010 (JCT-VC), incorporated by reference herein, likewise does not include a memory bandwidth enforcement mechanism. For robustness, a decoder must be prepared to accept bitstreams which may violate these limits as may be caused by transmission errors damaging a compliant bitstream or a non-conforming encoder. To alleviate such potential limitations the decoder frequently includes additional memory bandwidth, at added expense and complexity, to accommodate the non-compliant bit streams that are provided.

In order to provide a more computationally robust decoder with limited memory bandwidth and/or memory storage requirements, the decoder should be modified in a suitable manner However, while modifying the decoder to reduce the memory requirements, the corresponding rate distortion performance of the video should not be substantially degraded. Otherwise, while the memory requirements may be reduced, the resulting quality of the video will not be suitable for viewing by the audience. The modification 270 results in a doubling of the de-quantized coefficient value for every 6 steps in the quantization parameter, and thus may substantially increase the size of the memory requirements. The increased value results in one or more zeros being included as the least significant bits.

Figure 3A:
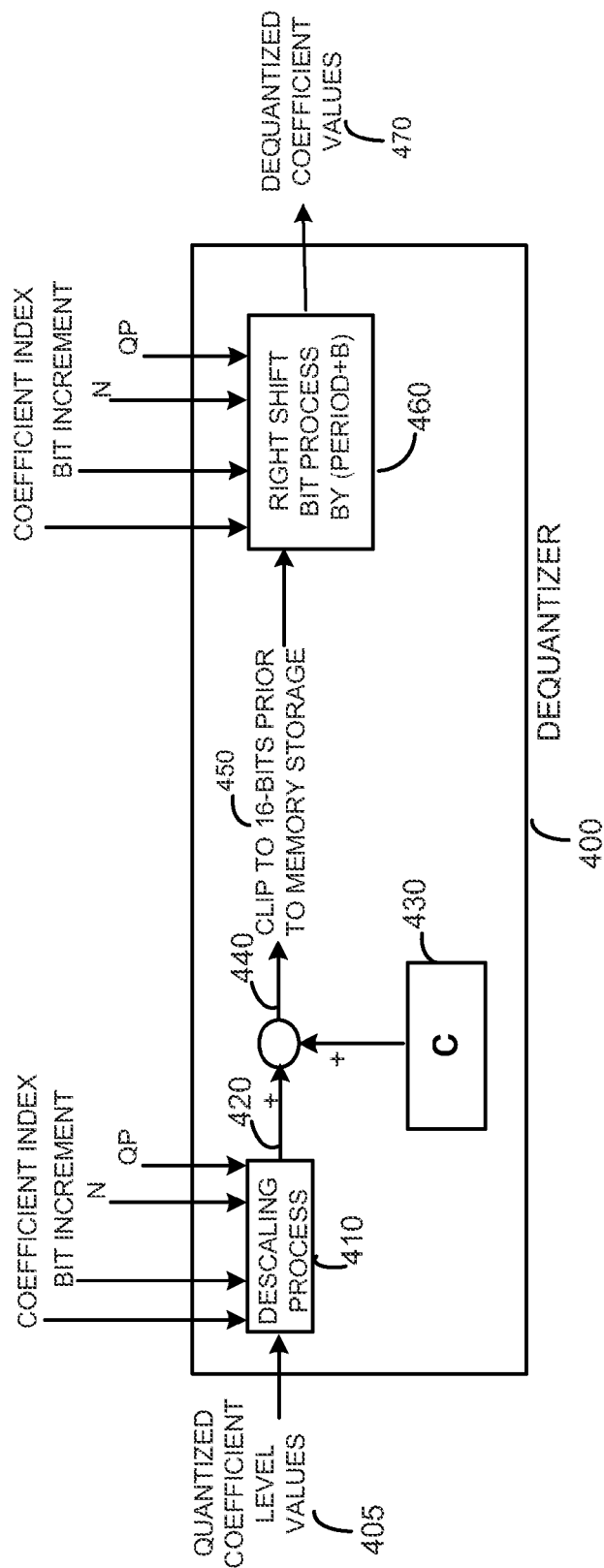
FIGS. 3A and 3B illustrate a dequantizer.

Referring to FIG. 3A, a modified dequantizer 400 (see FIGS. 3A and 3B) receives the quantized coefficient level values 405 and descales the quantized coefficient level values 405 using a descaling process 410, preferably based upon a function of a remainder, transform size (N), and/or coefficient index (e.g., position), to determine an intermediate set of values 420. An optional adjustment mechanism C 430 may be applied, which is preferably a variable dependent on transform size (N) or a function of a received quantization parameter (QP), to determine resulting data 440. The resulting data 440 from the quantized coefficient level values 405 may include rogue data or otherwise is not compliant with a standard, and accordingly the modified dequantizer 400 should impose a fixed limit on the resulting data 440. The resulting data 440 is preferably clipped 450 to a predetermined bit depth, and thus an N×N block of data is stored in memory within the dequantizer 400. For example the clipping 450 for a predetermined bit depth of 16 bits results in any values over 32,767 being set to the maximum value, namely, 32,767. Likewise for a predetermined bit depth of 16 bits results in any values less than −32,768 being set to the minimum value, namely, −32,768. Other bit depths and clipping values may likewise be used. In this manner, the maximum memory bandwidth required is limited by the system, in a manner independent of the input quantized coefficients. This reduces the computational complexity of the system and reduces the memory requirements, which is especially suitable for embedded systems.

Figure 3B:
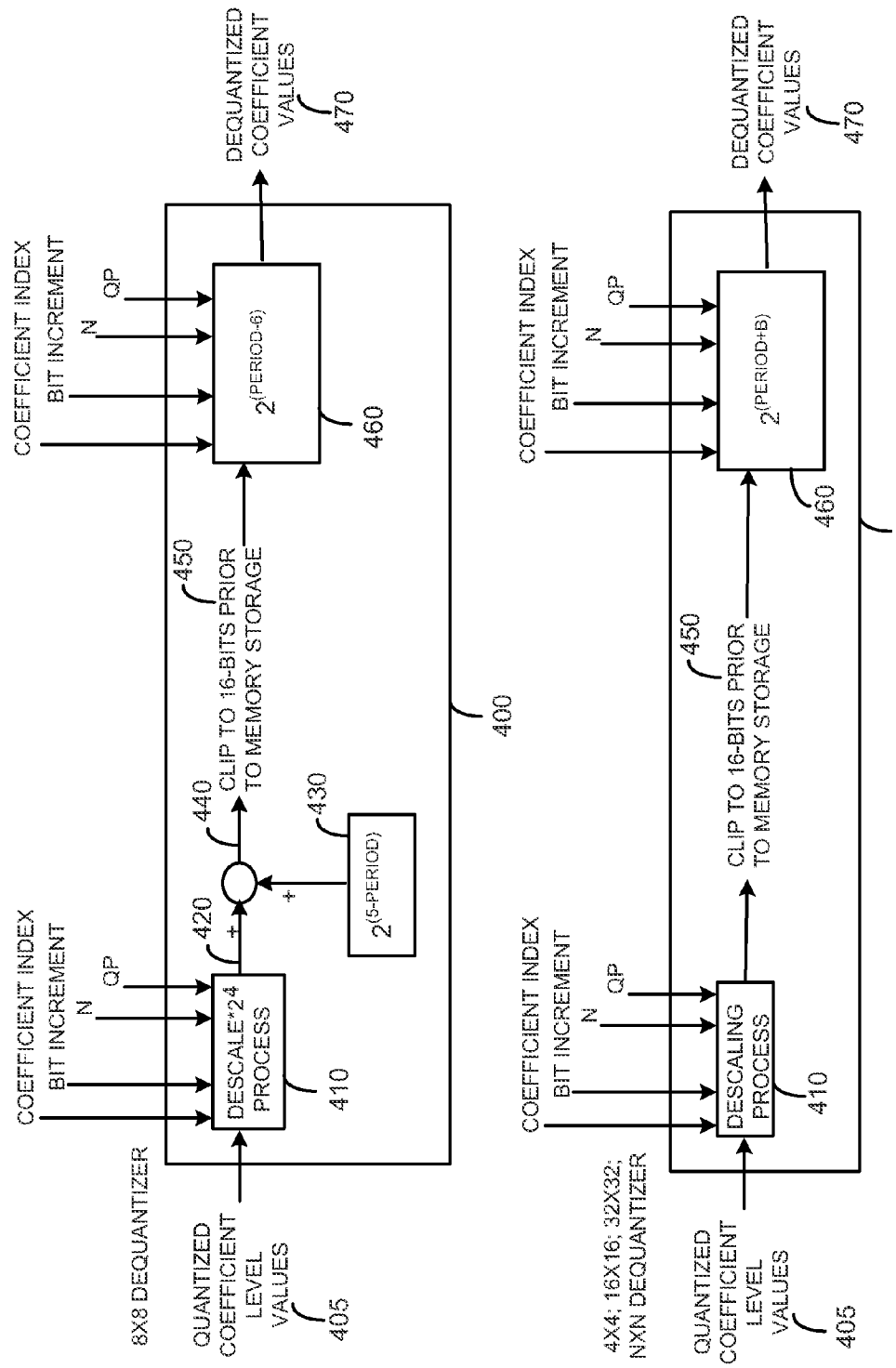

After imposing the clipping 450, the data with the maximum predetermined bit depth is modified by a factor of $2^{(Period+B)}$ 460. The results of the modification 460 are provided as dequantized coefficient values 470. The result of performing the $2^{(Period+B)}$ 460 after the clipping 450 reduces the rate distortion loss. Preferably, the adjustment mechanism C 430 used for 8×8 transform coefficients is $2^{(5-Period)}$ and the $2^{(Period+B)}$ 460 is $2^{(Period-6)}$. The process 460 may be based upon, if desired, a function of the transform size (N) or a function of a received quantization parameter (QP). Also, the adjustment mechanism C 430 used for other sized transform coefficients (such as 4×4, 16×16, and 32×32) is preferably zero, and the valued of $2^{(Period+B)}$ 460 is $2^{(Period)}$. Also, B may be a function of the transform size N and C may be a function of the transform size N. Referring to FIG. 3B, a particular implementation of FIG. 3A is illustrated. It is to be understood that any suitable dequantizer may be used.

For example, the clipping to 16 bits (or any other suitable bit depth such as for example 14 bits) may be performed as the last step of the dequantizer. Moreover, preferably the bit depth of the dequantized coefficient values 470 are predetermined to a known bit depth. Also, the dequantization may include a shifting operation to achieve a different bit depth for the dequantized coefficient values 470.

Figure 4A:
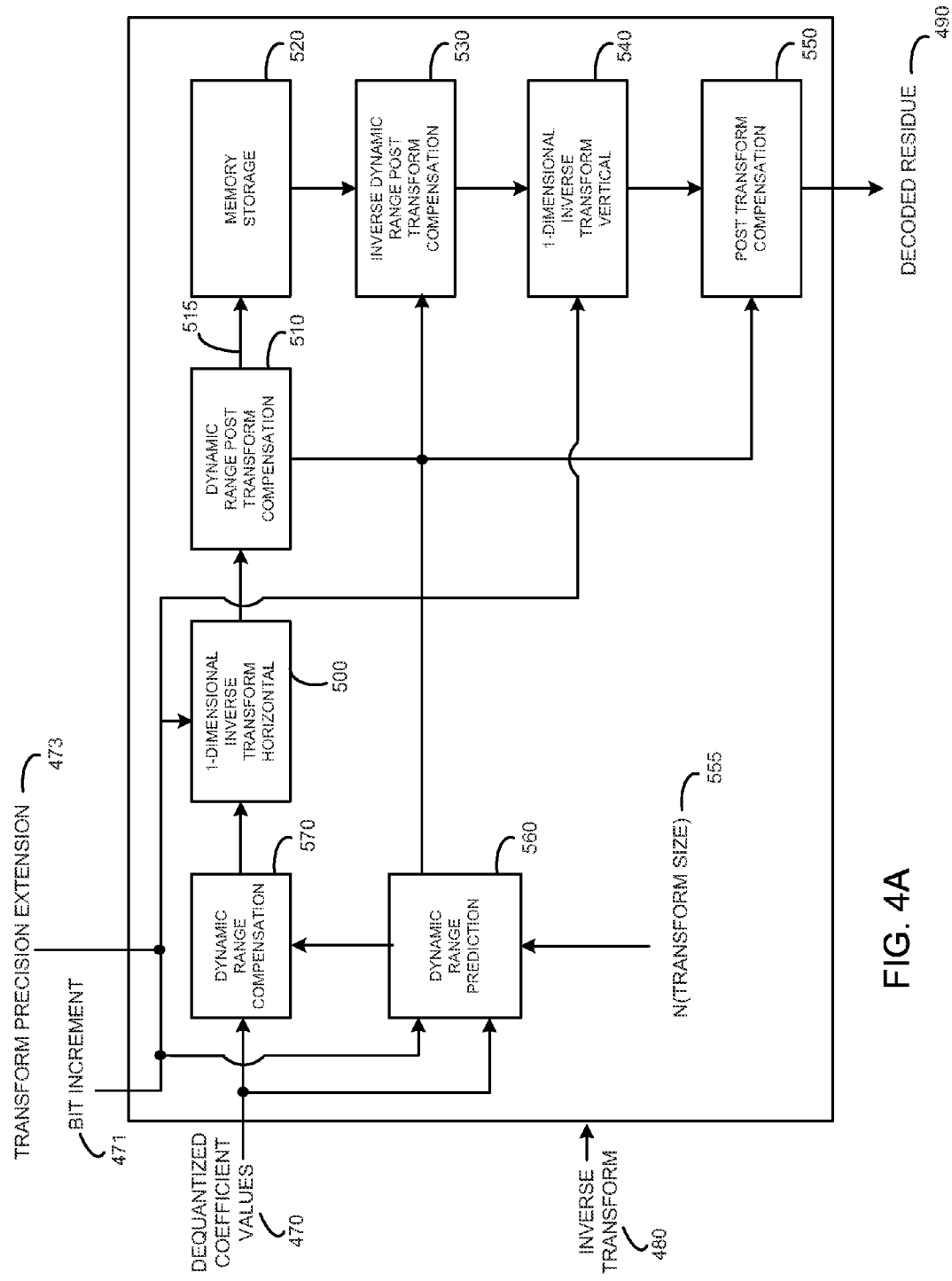
FIGS. 4A-4F illustrate inverse transforms.

Referring to FIG. 4A, the dequantized coefficient values 470 from the dequantizer 400 (see FIGS. 3A and 3B) are provided to an inverse transform 480 designed to provide a decoded residue 490 that has an acceptable rate distortion loss. The inverse transform 480 may also receive a bit increment 471 and a transform precision extension 473. The dequantized coefficient values 470 are preferably transformed by a 1-dimensional inverse transform horizontal 500. The resulting dynamic range from the 1-dimensional inverse transform horizontal 500 may be estimated by a dynamic range prediction 560, and in many cases, the dynamic range prediction 560 indicates that the resulting dynamic range from the particular dequantized coefficient values 470 would be greater than the desired dynamic range. Data from the dynamic range prediction 560 may be provided to a dynamic range compensation 570 which modifies the dequantized coefficient values 470 in a suitable manner such that the output of the 1-dimensional inverse transform horizontal 500 is within the desired dynamic range. The modification may be based upon any suitable technique, such as for example, a shifting process, a scaling process, a clipping process, and/or a zeroing process that selectively sets a value to zero, and otherwise does not modify the value. Accordingly by using a pre-compensation technique for the coefficients, the dynamic range of the output of the inverse transform 480 may be suitably controlled in a manner consistent with maintaining sufficient image quality. This technique may be implemented in a manner that guarantees or otherwise enforces the dynamic range at the output of the 1-dimensional inverse transform horizontal 500.

It is to be understood that the 1-dimentional inverse transform horizontal 500 may be horizontal and/or vertical. In addition, the 1-dimensional inverse transform horizontal 500 may use any suitable technique, including for example, a two-dimensional transform implemented as a sequence of a pair of one dimensional transforms.

In many cases, the dynamic range compensation 570 may result in a rather aggressive modification to the dequantized coefficient values 470 beyond that desirable to maintain a suitably high image quality. In this case, the dynamic range compensation 570 may be used in conjunction with a dynamic range post transform compensation 510 which may further modify the resulting data to a desired dynamic range, such as 16 bits. The dynamic range prediction 560 may provide data to the dynamic range post transform compensation 510 indicating a suitable post transform modification. The dynamic range post transform compensation 510 may be any suitable technique, such as for example, a shift process. Accordingly, using a dynamic range compensation 570 for the de-quantized coefficient values together with a dynamic range post transform compensation 510, the inverse transform 480 may be performed in a manner consistent with maintaining sufficient image quality. The resulting data from the dynamic range post transform compensation 510 having a suitable dynamic range, such as 16 bits, is stored in a memory storage 520.

In some cases, the dynamic range post transform compensation 510 is suitable to be reversed, at least to some extent. For example, if the dynamic range post transform compensation 510 shifts the bits two to the right, an inverse dynamic range post transform compensation 530 may be used to reverse (or generally reverse) the process, such as shifting the bits two to the left. A 1-dimensional inverse transform vertical 540 may operate on the data from the inverse dynamic range post transform compensation 530 and the memory storage 520 (see FIG. 4A and FIG. 4C), or may operate on the data from the 1-dimensional inverse transform horizontal 500 and the memory storage 520 (see FIG. 4B). When the data from the 1-dimensional inverse transform vertical 540 is not stored in memory, it may not be as meaningful to provide controls on the dynamic range of its output and thus there may be no need for another dynamic range compensation for the 1-dimensional inverse transform vertical 540. If desired, the dynamic range prediction 560 may take into account the 1-dimensional inverse transform horizontal 500 and the 1-dimensional inverse transform vertical 540.

The modified effects of the 1-dimensional inverse transform vertical 540 is the result of primarily the modifications from the dynamic range compensation 570, since the dynamic range post transform compensation 510 and the inverse dynamic range post transform compensation 530 tend to have offsetting effects. In some embodiments, the compensations 510 and 530 may be omitted, or the compensations 510 and 530 may permit unity compensations so the data remains unchanged. The resulting data from the 1-dimensional inverse transform vertical 540 may be modified by a post transform compensation 550. The post transform compensation 550 preferably reverses (or substantially reverses) the dynamic range compensation 570. For example, if the dynamic range compensation 570 was shift right by 3 bits, then the post transform compensation 550 is preferably shift left by 3 bits. In many cases the dynamic range prediction 560, is based upon the transform size (N) 555. The transform size (N) is typically related to different inverse transforms being used.

One way to characterize the dynamic range prediction 560 is as follows:

If Norm Coefficients >= TH(M) then
    Dynamic Range Violation = true
ELSE
    Dynamic Range Violation = false
ENDIF where, Norm Coefficients is the Norm measure of the coefficients (defined below), and TH is a threshold (defined below). For example, the predicted dynamic range process described herein may be used to construct the value sent from the dynamic range prediction 560 to the other modules (dynamic range compensation 570, dynamic range post transform compensation 510, inverse dynamic range post transform compensation 530, and/or post transform compensation 550). Each of these modules may use the predicted dynamic range to control its processing. Equivalently, a single control value may be provided by the dynamic range prediction 560 to control the compensation processes. For example, the dynamic range prediction 560 may be used to control a set of shifts used in the compensation modules based on the difference between the predicted dynamic range and desired intermediate dynamic range used in the memory storage.

The characterization of the dynamic range prediction 560 above may be based upon (1) Norm Coefficients is a measure of the coefficients, such as a maximum of L1 norms of rows, maximum of L1 norms of columns, L1 norm of a block, maximum of L-infinity norms of rows, maximum of L-infinity norms of columns, L-infinity norm of block, a maximum function, a minimum function, etc.; where L1 norm of a vector (row/column) $\vec{v}=[v_0, v_1, \ldots, v_{\mu-1}]$ is $\Sigma_{i=0 \ to \ \mu-1}$ Abs($v_i$); and the L1 norm of a matrix/block $$W = \begin{bmatrix} w_{0,0} & \cdots & w_{0,\omega-1} \\ \vdots & \ddots & \vdots \\ w_{\mu-1,0} & \cdots & w_{\mu-1,\omega-1} \end{bmatrix}$$

is $\Sigma_{i=0 \ to \ \mu-1} (\Sigma_{j=0 \ to \ \omega-1}$ Abs($w_{i,j}$)); the L-infinity norm of a vector (row/column) $\vec{v}=[v_0, v_1, \ldots, v_{\mu-1}]$ is Max$_{i=0 \ to \ \rho-1}$ (Abs($v_i$)); and the L-infinity norm of a matrix/block $$W = \begin{bmatrix} w_{0,0} & \cdots & w_{0,\omega-1} \\ \vdots & \ddots & \vdots \\ w_{\mu-1,0} & \cdots & w_{\mu-1,\omega-1} \end{bmatrix}$$

is Max$_{i=0 \ to \ \mu-1}$ (Max$_{j=0 \ to \ \omega-1}$ (Abs($w_{i,j}$))). Note, $$\text{Abs}(x) = \begin{cases} x & \text{if } x \geq 0 \\ -x & \text{if } x < 0 \end{cases}; \text{ and Max}(x, y) = \begin{cases} x & \text{if } x \geq y \\ y & \text{if } x < y \end{cases};$$

and Max$_{i=0 \ to \ \alpha-1}(x_i)$=Max ($x_0$, Max($x_1$, Max( . . . Max($x_{\alpha-2}$, $x_{\alpha-1}$) . . . ))); and $$\text{Min}(x, y) = \begin{cases} x & \text{if } x \leq y \\ y & \text{if } x > y \end{cases};$$

and $\text{Min}_{i=0 \text{ to } \alpha-1}(x_i) = \text{Min}(x_0, \text{Min}(x_1, \text{Min}( \ldots \text{Min}(x_{\alpha-2}, x_{\alpha-1}) \ldots )))$; (2) TH is a threshold, such as L-infinity norm of row/column/block of transform matrix plus a size dependent error term multiplied by a scalar value dependent on the dynamic range post transform compensation or L1 norm of row/column/block of transform matrix plus a size dependent error term multiplied by a scalar value dependent on the dynamic range post transform compensation; (3) M is a transform matrix (defined below) which often varies with the transform size N; and (4) Dynamic Range Violation indicates that the coefficients should be modified by the dynamic range compensation. The L1 norm of a row, a column, or a block is the sum of absolute value of entries of the row, the column, or the block, respectively. The L-infinity norm of a row, column, or block is the maximum absolute value of the entries in the row, column, or block respectively. For example, the norm may be the maximum over the rows of the L1-norms of the columns of a block.

As illustrated, rather than using a binary decision of in range or out of range, a predicted dynamic range may be provided that is used to provide additional control over the compensation processes. Given the de-quantized coefficient values, the system may compute the norm (different options), which is used to predict dynamic range from norm and transform properties. The norm may be as defined in JCTVC-E333, incorporated by reference herein. This predicted dynamic range may be used in the dynamic range compensation (570), the dynamic range post transform compensation (510) and the inverse dynamic range post transform compensation (530).

One example of the predicted dynamic range is based on the norm of the de-quantized coefficient values. Here, the amount of dynamic range prediction is a function of the term $\|M \cdot \vec{x}\|_\infty$, which is predicted from (bounded by) either the product of L1-norm of the transform matrix and the L infinity norm of the de-quantized coefficient vector or from the product of the L infinity norm of the transform matrix and the L1-norm of the de-quantized coefficient vector. The transform matrix is a matrix that represents the 1-dimensional inverse transform horizontal, the 1-dimensional inverse transform vertical, the combination of the 1-dimensional inverse transform horizontal and 1-dimensional inverse transform vertical, or any other inverse transform. The de-quantized coefficient vector is a representation of the de-quantized coefficient values stored in vector form. Here, M refers to the transform matrix and $\vec{X}$ refers to the de-quantized coefficient vector.

$$\text{Predicted Dynamic Range} = \|M \cdot \vec{x}\|_\infty \leq \|M\|_1 \cdot \|\vec{x}\|_\infty \qquad \text{Eq 1}$$

$$\text{Predicted Dynamic Range} = \|M \cdot \vec{x}\|_\infty \leq \|M\|_\infty \cdot \|\vec{x}\|_1 \qquad \text{Eq 2}$$

Figure 4B:
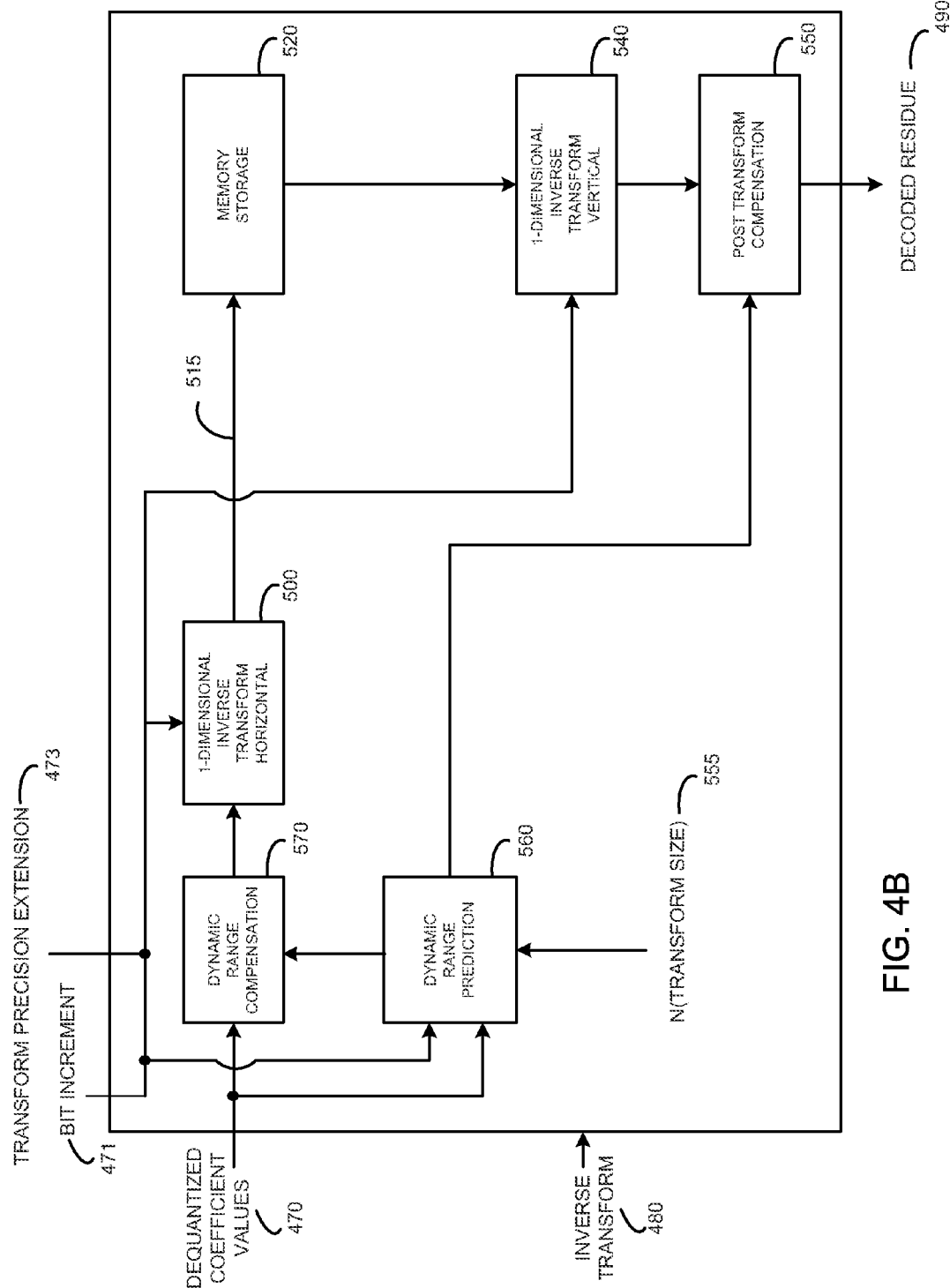

The norm of the transform matrix, denoted above as $\|M\|_1$ and $\|M\|_\infty$, then depends upon characteristics of the inverse transform represented by the transform matrix, including the transform size. The dynamic range compensation 570 and post transform compensation 550 may include any suitable technique. Referring to FIG. 4B, a modified technique is shown where the dequantized coefficient values 470 from the dequantizer 400 are provided to an inverse transform 480 designed to provide a decoded residue 490 that has an acceptable rate distortion loss. In the embodiment illustrated in FIG. 4B, the dynamic range post transform compensation 510 and the inverse dynamic range post transform compensation 530 are omitted.

Figure 4C:
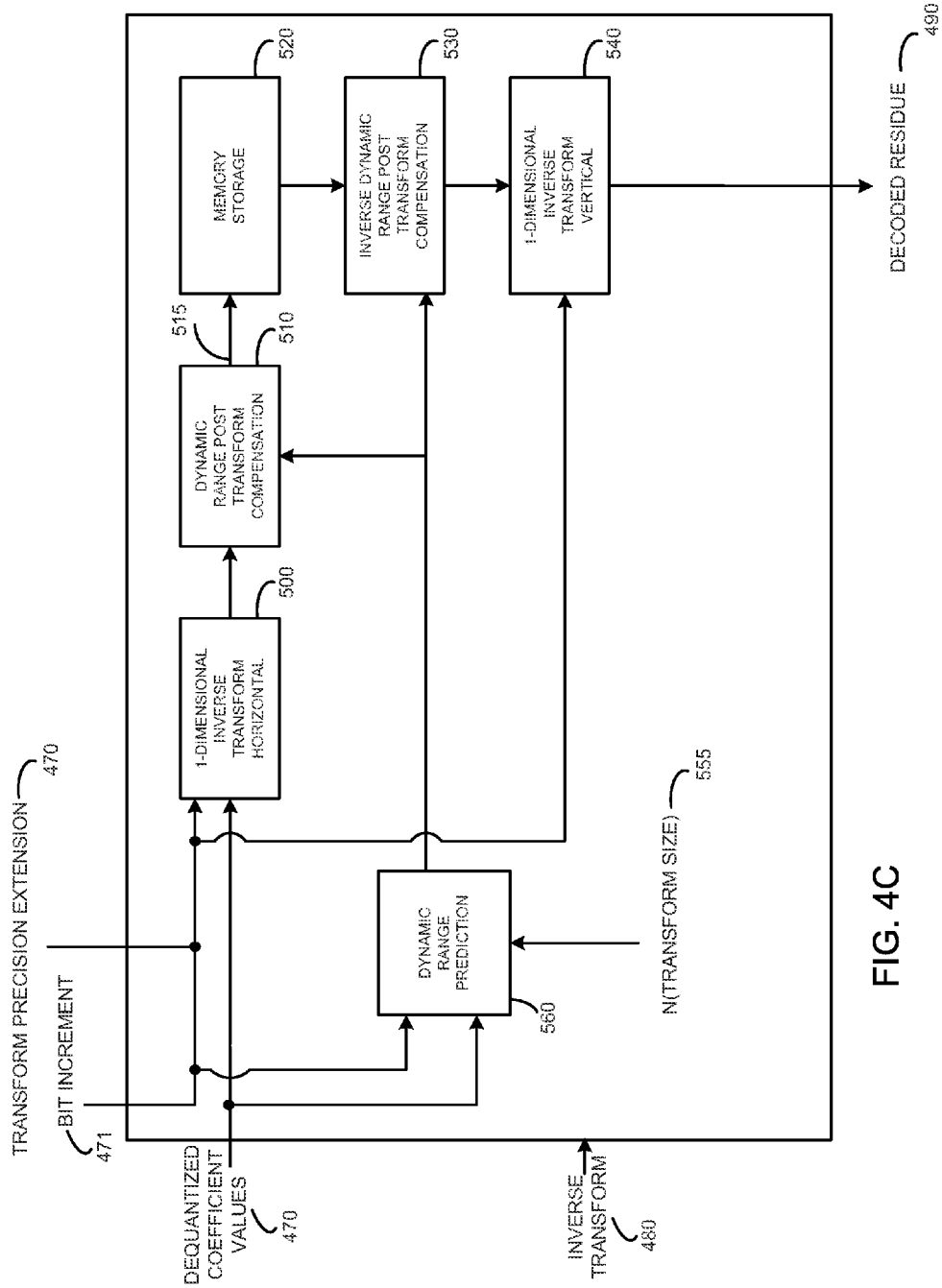

Referring to FIG. 4C, another technique is shown where the dequantized coefficient values 470 from the dequantizer 400 are provided to an inverse transform 480 designed to provide a decoded residue 490 that has an acceptable rate distortion loss. In the embodiment illustrated in FIG. 4C, the dynamic range compensation 570 and the post transform compensation 550 are omitted.

Figure 4D:
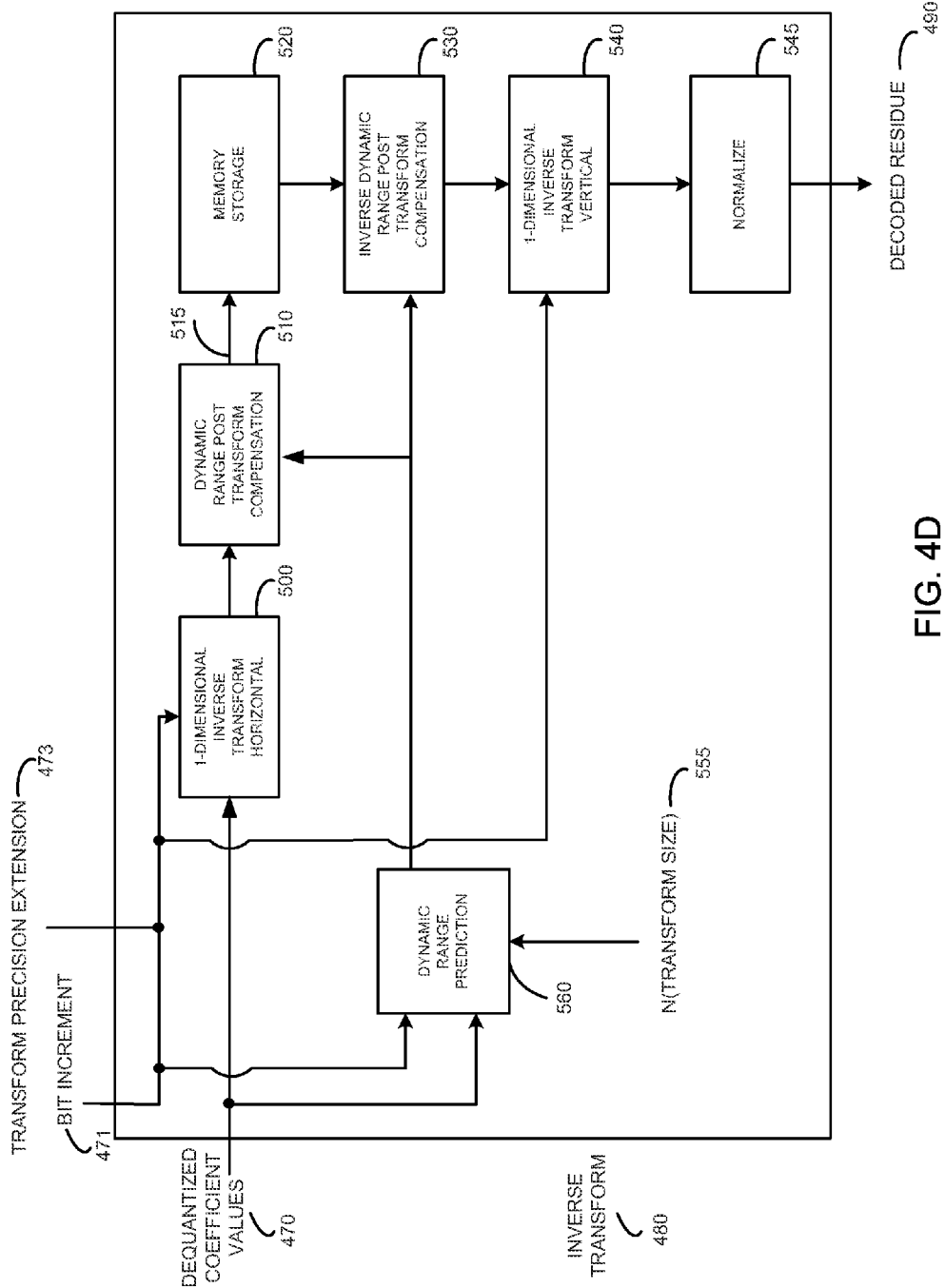

Referring to FIG. 4D, the dynamic range prediction prefers intermediate values 515 within the inverse transform 480 not greater than 16-bits. If the predicted dynamic range is r and the desired dynamic range of the intermediate values is 16-bits, then the dynamic range post transform compensation 510 may right shift by r-16 bits and the inverse dynamic range post transform compensation 530 may left shift by the same amount r-16 bits. After the 1-dimensional inverse transform vertical 540 the values may be normalized 545 to provide the decoded residue 490.

Figure 4E:
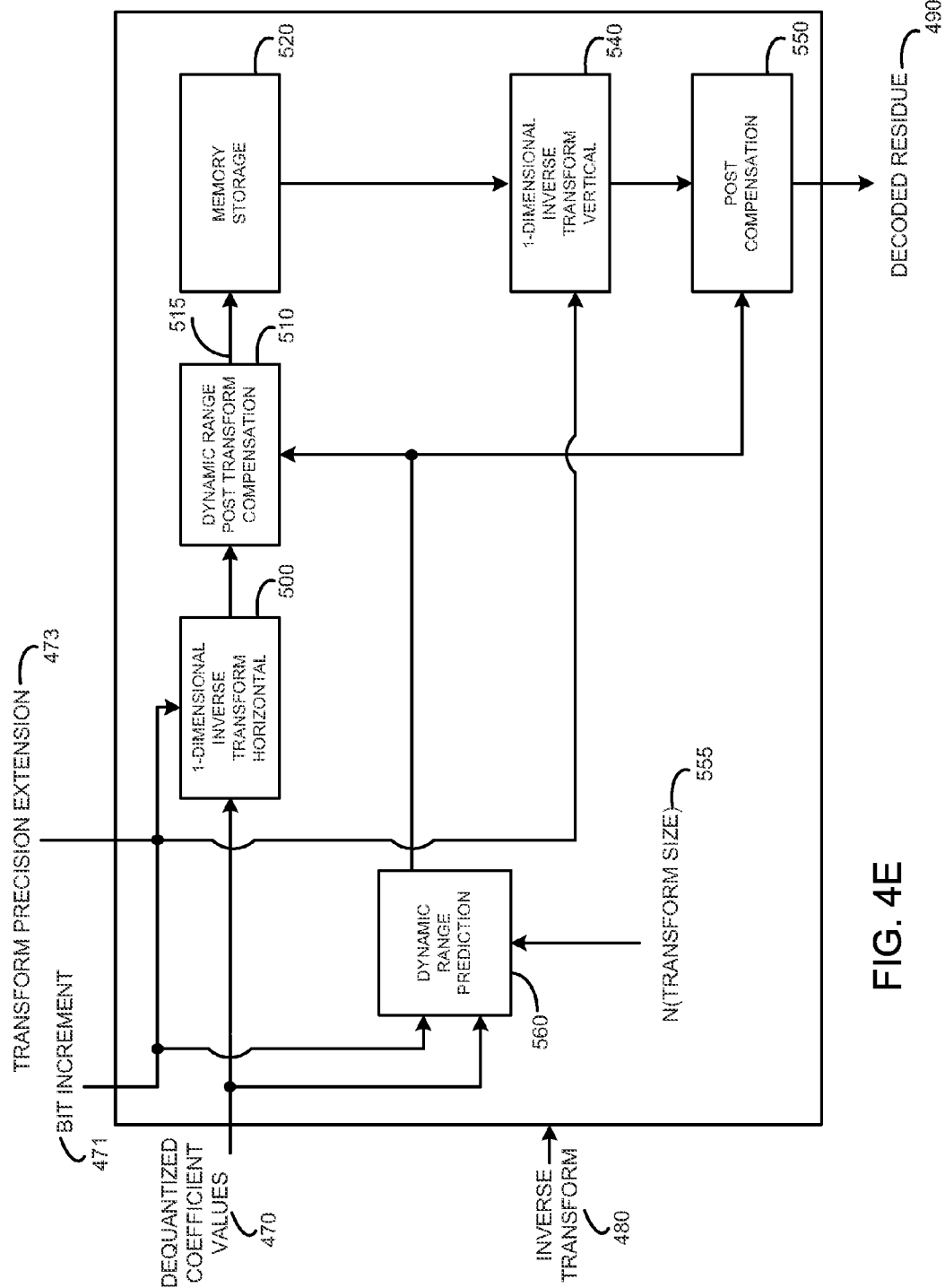

Referring to FIG. 4E, the dynamic range prediction preferably has intermediate values 515 within the inverse transform 480 not greater than 16-bits. If the predicted dynamic range is r and the desired dynamic range of the intermediate values is 16-bits, then the dynamic range post transform compensation 510 may right shift by r-16 bits and the post compensation 550 may left shift by the same amount r-16 bits. After the post compensation 550 the decoded residue 490 is provided.

Alternatively the prediction and compensation aspects of FIG. 4A can be data independent by controlling the bit-depth at the output of the dequantizer. In some embodiments the dynamic range compensation 570 may use a clipping operation to control the bit depth. The clip value of the resulting clipping operation may be dependent on the transform size parameter. Thus, for smaller transform size parameters the clipping operation may result in a smaller bit depth.

Figure 4F:
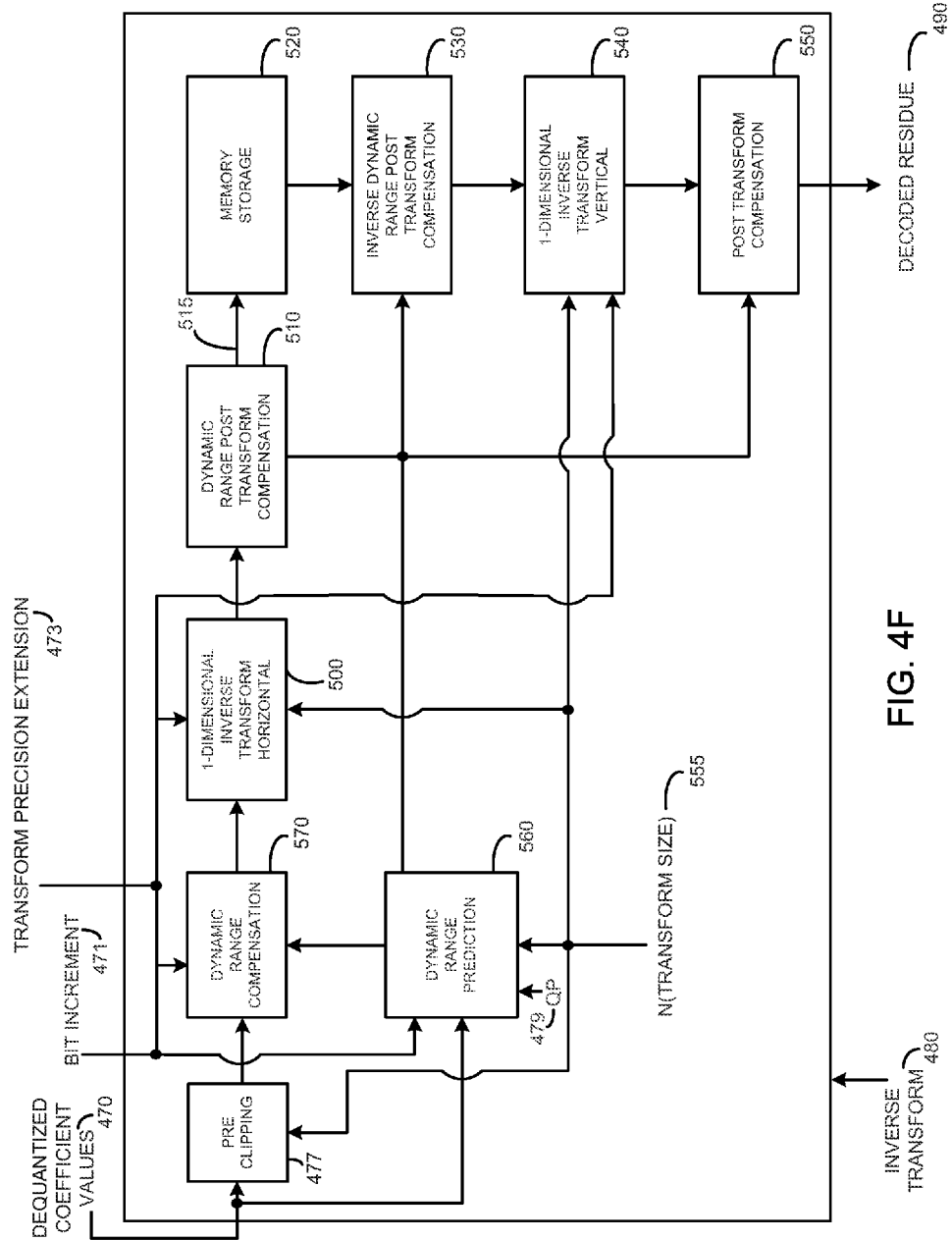

Referring to FIG. 4F, a transform size N parameter 555 may be used as an input for transform size parameter dependent pre-clipping 477 of the dequantized coefficient values 470 to further permit control over the dynamic range. Also, the transform size N parameter 555 may be used as an input for one or more of the inverse transforms 500 and 540. Moreover, the quantization parameter 479 may be used as an input to the dynamic range prediction 560. Further, the transform size N parameter 555 may be used as an input to the dynamic range prediction 560, which determines a shift amount, which may be used for a shift to the right by the dynamic range post transform compensation 510, and a shift to the left by the post compensation 550 or inverse dynamic range post transform compensation 530. The same parameter relating to the transform size N parameter 555 may be used for one or more of the different functions.

The fixed bit shift for the dynamic range compensation between the 1-dimensional inverse transform horizontal 500 and the 1-dimensional inverse transform vertical 540 first and second inverse transforms is effective at ensuring a limited dynamic range. However, the decoded residue 490 tends to have different sensitivity to the precision loss due to the fixed bit shift for different parts of the residue image. Larger residue values have less sensitivity to the precision loss due to a fixed bit shift compared to smaller residue values undergoing the same fixed bit shift. Moreover, larger residue values of the image need to be shifted by larger amounts to fit within a given dynamic range, while relatively smaller residue values need to be shifted by relatively smaller amounts to fit within a given dynamic range. Thus, it is desirable that the larger residue values of the image are shifted a greater amount than relatively smaller residue values of the image.

Figure 5:
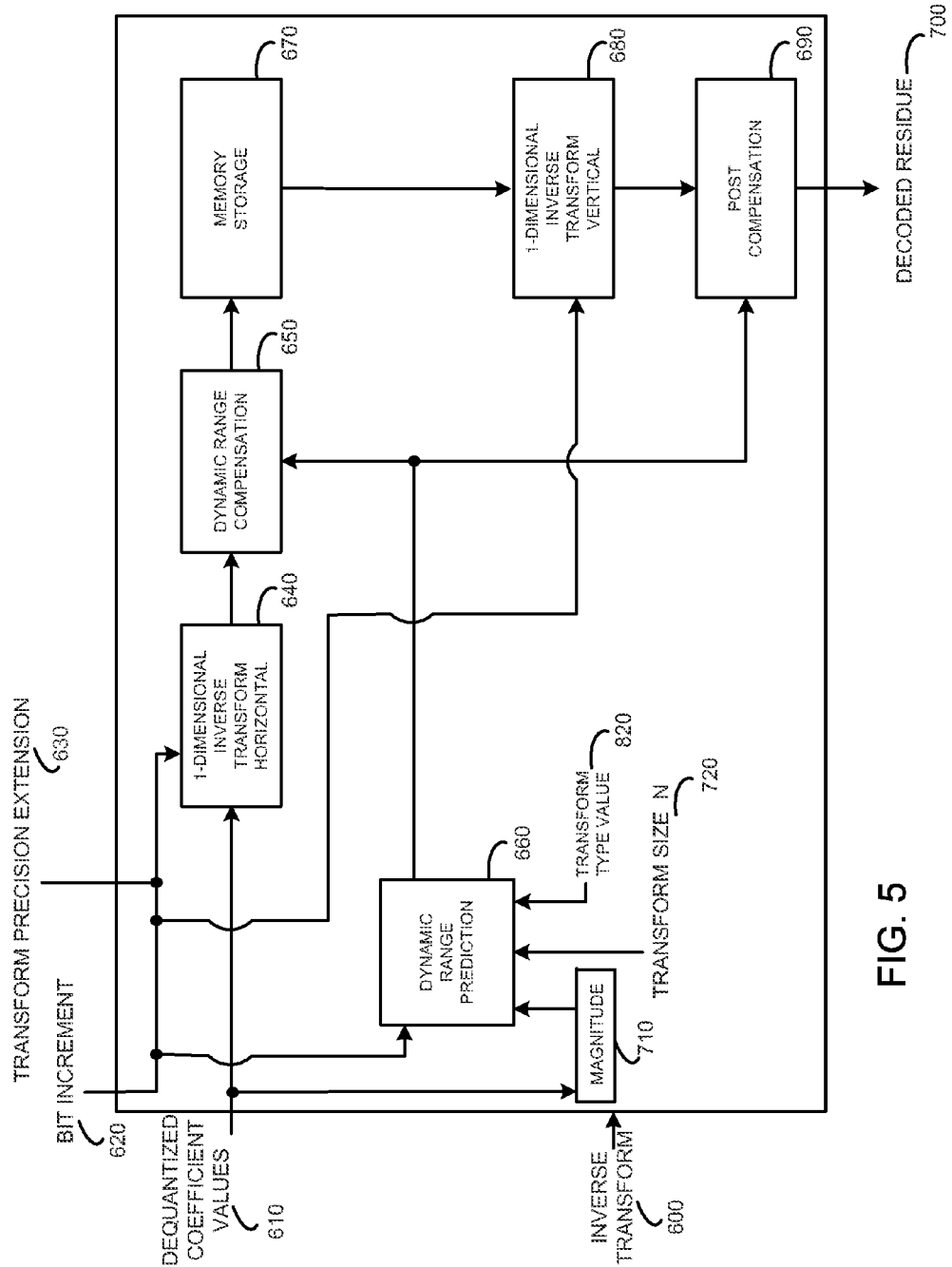
FIG. 5 illustrates a modified inverse transform.

Referring to FIG. 5, a modified inverse transform 600 is illustrated. The inverse transform 600 may receive dequantized coefficient values 610 from a dequantizer, and it may receive a bit increment 620 and a transform precision extension 630. The inverse transform 600 may include a 1-dimensional inverse transform horizontal 640 that receives the dequantized coefficient values 610. A dynamic range compensation 650 modifies the results of the 1-dimensional inverse transform horizontal 640 based upon data from a dynamic range prediction 660. The result of the dynamic range compensation 650 is stored in memory storage 670. The data stored in the memory storage 670 is provided to the 1-dimensional inverse transform vertical 680. A post compensation 690 may modify the results of the 1-dimensional inverse transform vertical 680, based upon the dynamic range prediction 660. The results of the post compensation 690 is a decoded residue 700. It is to be understood that the 1-dimensional inverse transform horizontal and 1-dimensional inverse transform vertical may be reversed, if desired.

The dynamic range prediction 660 may be based upon one or more factors. The principal factor that the dynamic range prediction 660 should be based upon is the magnitude 710 of the dequantized coefficient values 610. The magnitude of the coefficients 710 is preferably the absolute value of the dequantized coefficient values 610. For example, a maximum coefficient of a block of coefficients (or other selection of coefficients) may be used to select among a plurality of shift values for the dynamic range compensation 650. In addition to the magnitude, the dynamic range prediction 660 may be based upon the transform size N 720. The transform size N 720 characteristic provided to the dynamic range prediction 660 may be the size of a square block, may be the horizontal parameter of a rectangular block, and/or the vertical parameter of a rectangular block. For example, the dynamic range prediction 660 may modify its output differently depending on whether the transform size is a 4×16 or a 16×4 data. For example, the dynamic range prediction 660 may modify its output depending on whether the transform size is a 4×4 or a 8×8 data. Moreover, the dynamic range prediction 660 may modify its output depending on the transform type value 820 that indicates the characteristics of the inverse transform. For example, the combination of a 1-dimensional inverse transform horizontal that uses a discrete cosine transform and a 1-dimensional inverse transform vertical that uses a discrete cosine transform would correspond to a first transform type value. The combination of a 1-dimensional inverse transform horizontal that uses a discrete sine transform and a 1-dimensional inverse transform vertical that uses a discrete cosine transform would correspond to a second transform type value. In some embodiments, the transform type value is determined solely by the characteristics of the 1-dimensional inverse transform horizontal. Alternatively, the transform type value may be determined solely by the characteristics of the 1-dimensional inverse transform vertical.

As it will be noted, the horizontal and vertical size of an inverse transform may be taken into account in the selection of the output of the dynamic range prediction 660. Accordingly, the selected shift may be different for a 4×16 transform size than for a 16×4 transform size. Further, the selection of the shift for a 4×16 transform size or a 16×4 transform size may further be dependent on whether the 1-dimensional inverse transform horizontal is a horizontal or a vertical operation.

By way of example, exemplary thresholds are illustrated that may be used to construct a look up table. Given a shift value S and a transform matrix M, let x be a vector of dequantized coefficient values. The following inequality holds $$\|(M \cdot \vec{x}) \gg S\|_\infty \le \|M\|_1 \cdot \|\vec{x}\|_\infty \cdot \frac{1}{2^S}.$$

Let B be the desired bound on the dynamic range following the transform and shift, equivalent to the infinity norm on the left side of the inequality. Define a threshold by the equation $$\text{Threshold}(S, B, M) = \frac{2^S \cdot B}{\|M\|_1}.$$

A derivation shows that if the input norm is below this threshold, the desired bound on the dynamic range following the transform and shift is satisfied.

If $$\|\vec{x}\|_\infty \le \text{Threshold}(S, B, M) = \frac{2^S \cdot B}{\|M\|_1} \text{ then}$$

$$\|(M \cdot \vec{x}) \gg S\|_\infty \le \|M\|_1 \cdot \|\vec{x}\|_\infty \cdot \frac{1}{2^S} = \|\vec{x}\|_\infty \cdot \left(\|M\|_1 \cdot \frac{1}{2^S}\right)$$

So:

$$\|(M \cdot \vec{x}) \gg S\|_\infty \le = \|\vec{x}\|_\infty \cdot \left(\|M\|_1 \cdot \frac{1}{2^S}\right) \le \frac{2^S \cdot B}{\|M\|_1} \cdot \left(\|M\|_1 \cdot \frac{1}{2^S}\right) = B$$

and therefore the threshold on the vector of dequantized coefficient values implies the desired bound on dynamic range. Smaller thresholds will achieve the dynamic range bound but may impact compression performance so it is desirable to use thresholds as large as possible. As an example, if the desired dynamic range bound B=2^15 and the norm of the transform matrix is equal to 246, the threshold for shift of 7 may be selected as $$\text{Threshold}(7, 2^{15}, M) = 2^{14} = \frac{2^7 \cdot 2^{15}}{2^8} \le \frac{2^7 \cdot 2^{15}}{\|M\|_1}.$$

Figure 6:
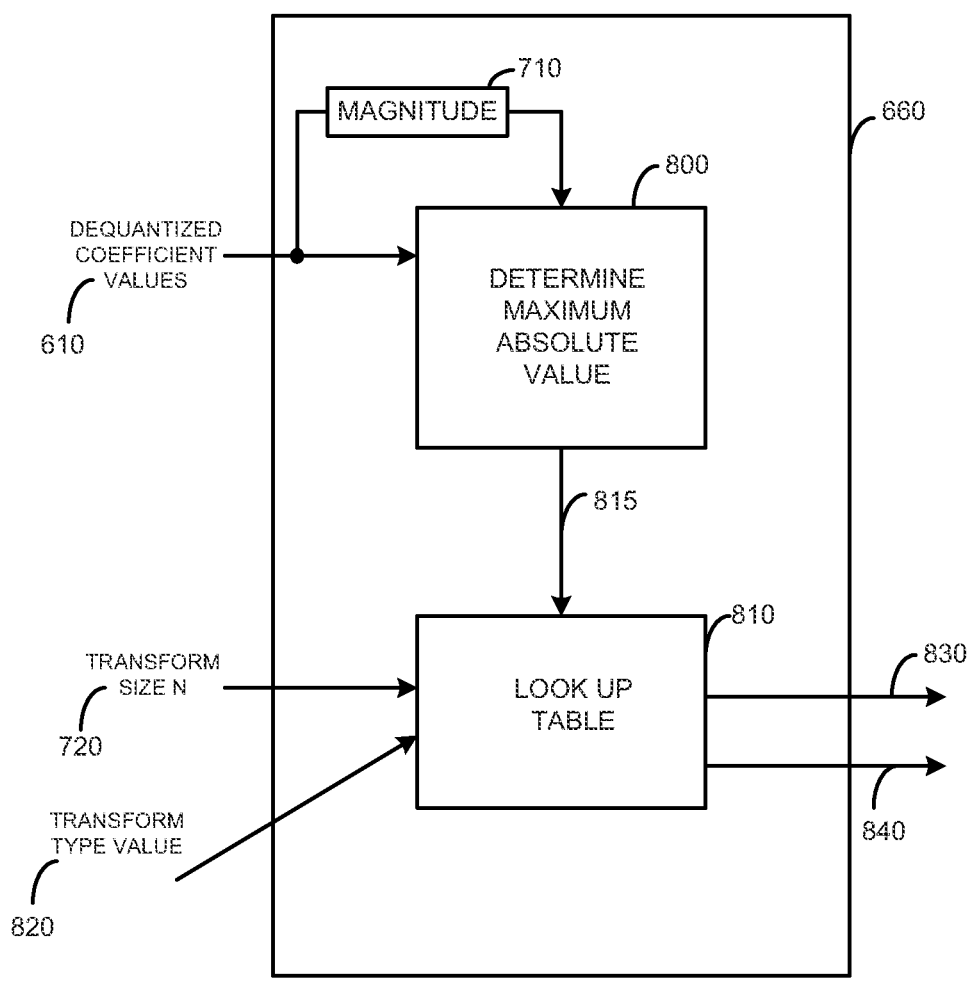
FIG. 6 illustrates an exemplary dynamic range prediction.

Referring to FIG. 6, one exemplary implementation of the dynamic range prediction 660 may include a determine maximum absolute value process 800 that receives the dequantized coefficient values 610 and receives the magnitude of the coefficients 710. The determine maximum absolute value process 800 determines the maximum value of a block and/or region and/or group and/or slice of dequantized coefficient values 610. The determine maximum absolute value process 800 provides the maximum value 815 to a look up table process 810. The look up table process 810 based upon the maximum value 815 (which may be used as an index value for the look up table 810) together with the transform size 720 and the transform type value 820 looks up a pair of suitable shift values. A first shift value 830 determined by the look up table process 810 is provided to the dynamic range compensation 650. The dynamic range compensation 650 uses the first shift value 830 to provide a suitable shift. A second shift value 840 determined by the look up table process 810 is provided to the post compensation 690. The post compensation 690 uses the second shift value 840 to provide a suitable shift.

The look up table 810 may include a plurality of fields denoted by a set of threshold values. Each of the entries of the look up table 810 may represent different combinations of the maximum value (denoted by "G") 815, transform size N 720, and transform type value 820.

The look up table 810 may be suitable for characterizing the following relationship, where the outputs 830 and 840 may be determined in any manner, such as for example, one of the outputs being identified as the shift value in the table with the other output being derived based upon the shift value, or both of the output 830 and 840 based upon the shift value:

| Maximum Absolute Value Test | Transform Size | Transform Type Value | Shift |
|---|---|---|---|
| $G > 2^{14}$ | 4 × 4 | iDCT | 8 |
| $G <= 2^{14}$ | 4 × 4 | iDCT | 7 |
| $G > 2^{14}$ | 4 × 16 | iDCT | 8 |
| $G <= 2^{14}$ | 4 × 16 | iDCT | 7 |
| $G > 2^{14}$ | 4 × 4 | iDST | 8 |
| $G <= 2^{14}$ | 4 × 4 | iDST | 7 |

The look up table 810 may be suitable for characterizing the following relationship, where the outputs 830 and 840 may be determined in any manner, such as for example, one of the outputs being identified as the shift value in the table with the other output being derived based upon the shift value, or both of the output 830 and 840 based upon the shift value:

| Maximum Absolute Value Test | Transform Size | Transform Type Value | Shift |
|---|---|---|---|
| $G > 2^{14}$ | 8 × 8 | iDCT | 9 |
| $2^{13} <= G <= 2^{14}$ | 8 × 8 | iDCT | 8 |
| $G < 2^{13}$ | 8 × 8 | iDCT | 7 |
| $G > 2^{14}$ | 8 × 32 | iDCT | 9 |
| $2^{13} <= G <= 2^{14}$ | 8 × 32 | iDCT | 8 |
| $G < 2^{13}$ | 8 × 32 | iDCT | 7 |

The look up table 810 may be suitable for characterizing the following relationship, where the outputs 830 and 840 may be determined in any manner, such as for example, one of the outputs being identified as the shift value in the table with the other output being derived based upon the shift value, or both of the output 830 and 840 based upon the shift value:

| Maximum Absolute Value Test | Transform Size | Transform Type Value | Shift |
|---|---|---|---|
| $G > 2^{14}$ | 16 × 16 | iDCT | 10 |
| $2^{13} < G <= 2^{14}$ | 16 × 16 | iDCT | 9 |
| $2^{12} < G <= 2^{13}$ | 16 × 16 | iDCT | 8 |
| $G <= 2^{11}$ | 16 × 16 | iDCT | 7 |
| $G > 2^{14}$ | 16 × 4 | iDCT | 10 |
| $2^{13} < G <= 2^{14}$ | 16 × 4 | iDCT | 9 |
| $2^{12} < G <= 2^{13}$ | 16 × 4 | iDCT | 8 |
| $G <= 2^{11}$ | 16 × 4 | iDCT | 7 |

The look up table 810 may be suitable for characterizing the following relationship, where the outputs 830 and 840 may be determined in any manner, such as for example, one of the outputs being identified as the shift value in the table with the other output being derived based upon the shift value, or both of the output 830 and 840 based upon the shift value:

| Maximum Absolute Value Test | Transform Size | Transform Type Value | Shift |
|---|---|---|---|
| $G > 2^{14}$ | 32 × 32 | iDCT | 11 |
| $2^{13} < G <= 2^{14}$ | 32 × 32 | iDCT | 10 |
| $2^{12} < G <= 2^{13}$ | 32 × 32 | iDCT | 9 |
| $2^{11} < G <= 2^{12}$ | 32 × 32 | iDCT | 8 |
| $G <= 2^{11}$ | 32 × 32 | iDCT | 7 |
| $G > 2^{14}$ | 32 × 8 | iDCT | 11 |
| $2^{13} < G <= 2^{14}$ | 32 × 8 | iDCT | 10 |
| $2^{12} < G <= 2^{13}$ | 32 × 8 | iDCT | 9 |
| $2^{11} < G <= 2^{12}$ | 32 × 8 | iDCT | 8 |
| $G <= 2^{11}$ | 32 × 8 | iDCT | 7 |

Preferably, all or a subset of the different thresholds are a power of 2 for efficient implementation.

Figure 7:
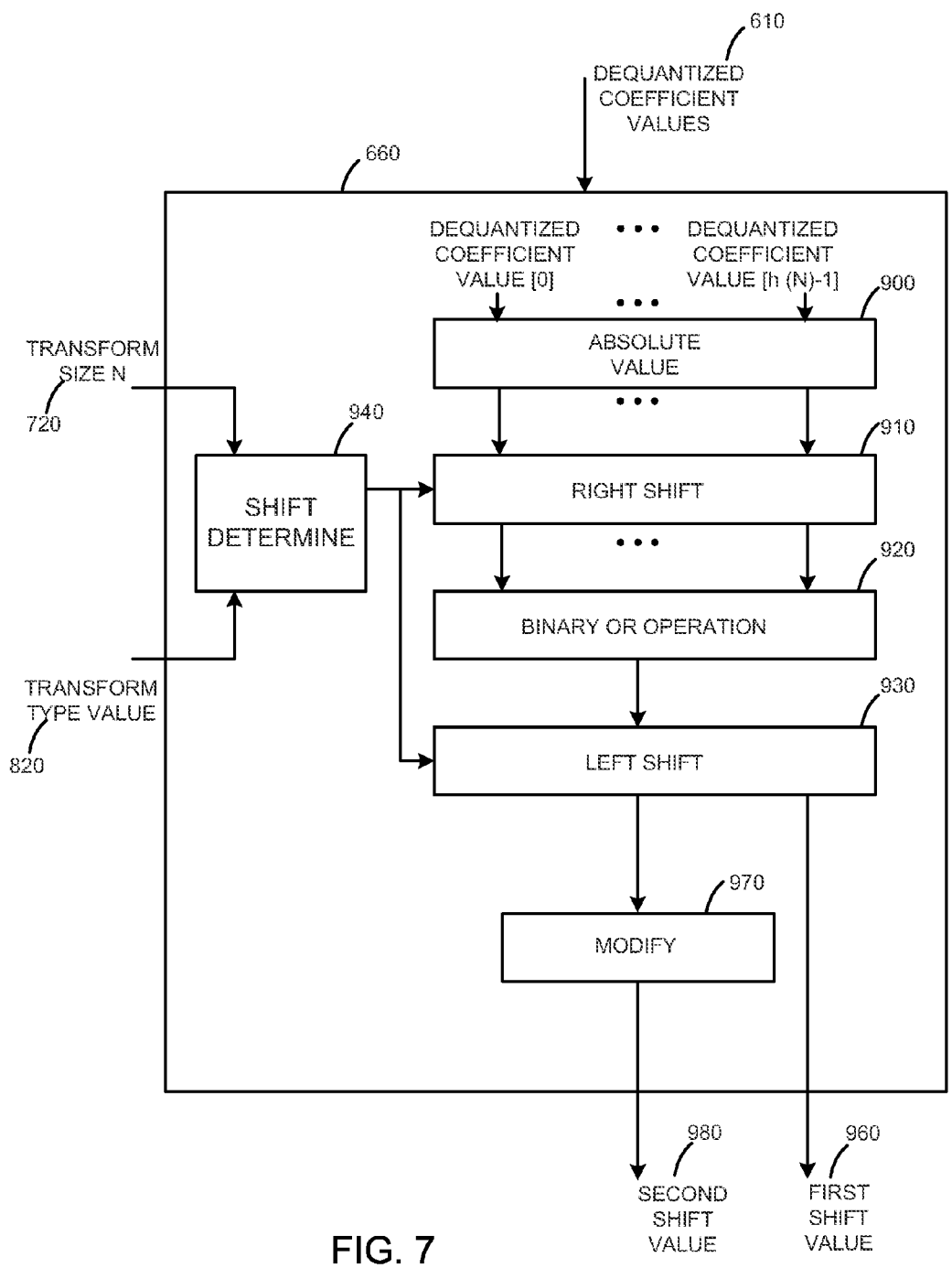
FIG. 7 illustrates another exemplary dynamic range prediction.

Referring to FIG. 7, one exemplary implementation of the dynamic range prediction 660 may include an absolute value process 900 that receives the dequantized coefficient values 610. The absolute value process 900 determines the absolute values of a dequantized coefficient value, where dequantized coefficient value[D], is the $D^{th}$ dequantized coefficient value in a set of dequantized coefficient values. D may take on any integer value from 0, 1, . . . , h(N), h(N)–1, where h(N) represents the number of elements in a transform with block size N 720. A set of operations including a right shift 910, a binary OR operation 920, and a left shift 930, collectively determine a maximum value of the set of dequantized coefficient values 610. The set of right shift 910 and left shift 930, collectively are controlled by a shift determine process 940. The shift determine process 940 receives the transform size N 720 and the transform type value 820 which is used to select the amount of the right shift 910 and the left shift 930. The result of the left shift 930 is a first shift value 960 to the dynamic range compensation 650. The output of the left shift 930 is modified 970 to provide a second shift value 980 that is provided to the post compensation 690. The determination of shift values may be implemented in the form of one or more look up tables.

Figure 8:
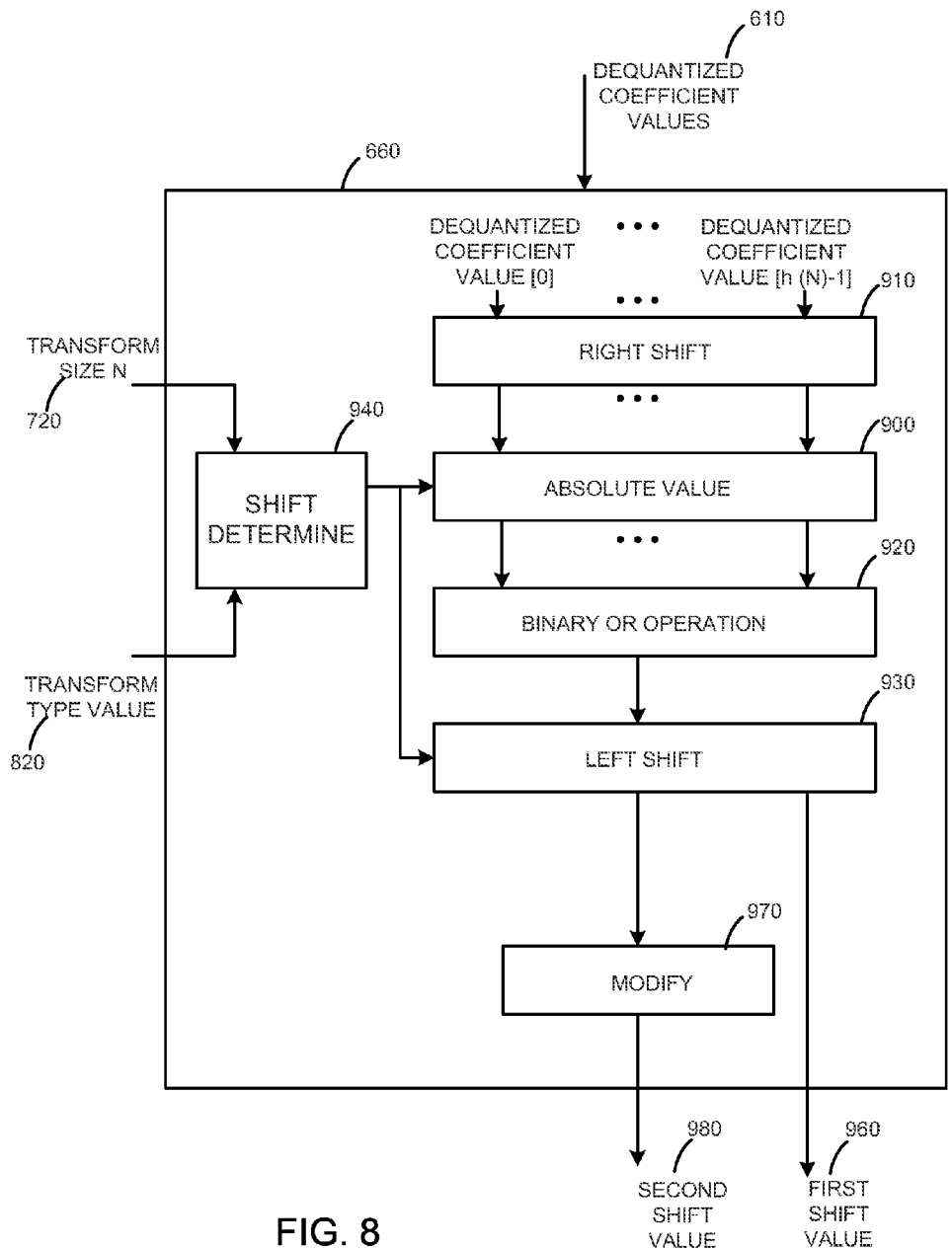
FIG. 8 illustrates a further exemplary dynamic range prediction.

Referring to FIG. 8, another modified exemplary implementation is similar to that shown in FIG. 7, with the right shift 910 and the absolute value 900 being switched with one another, and modified as necessary.

Figure 9:
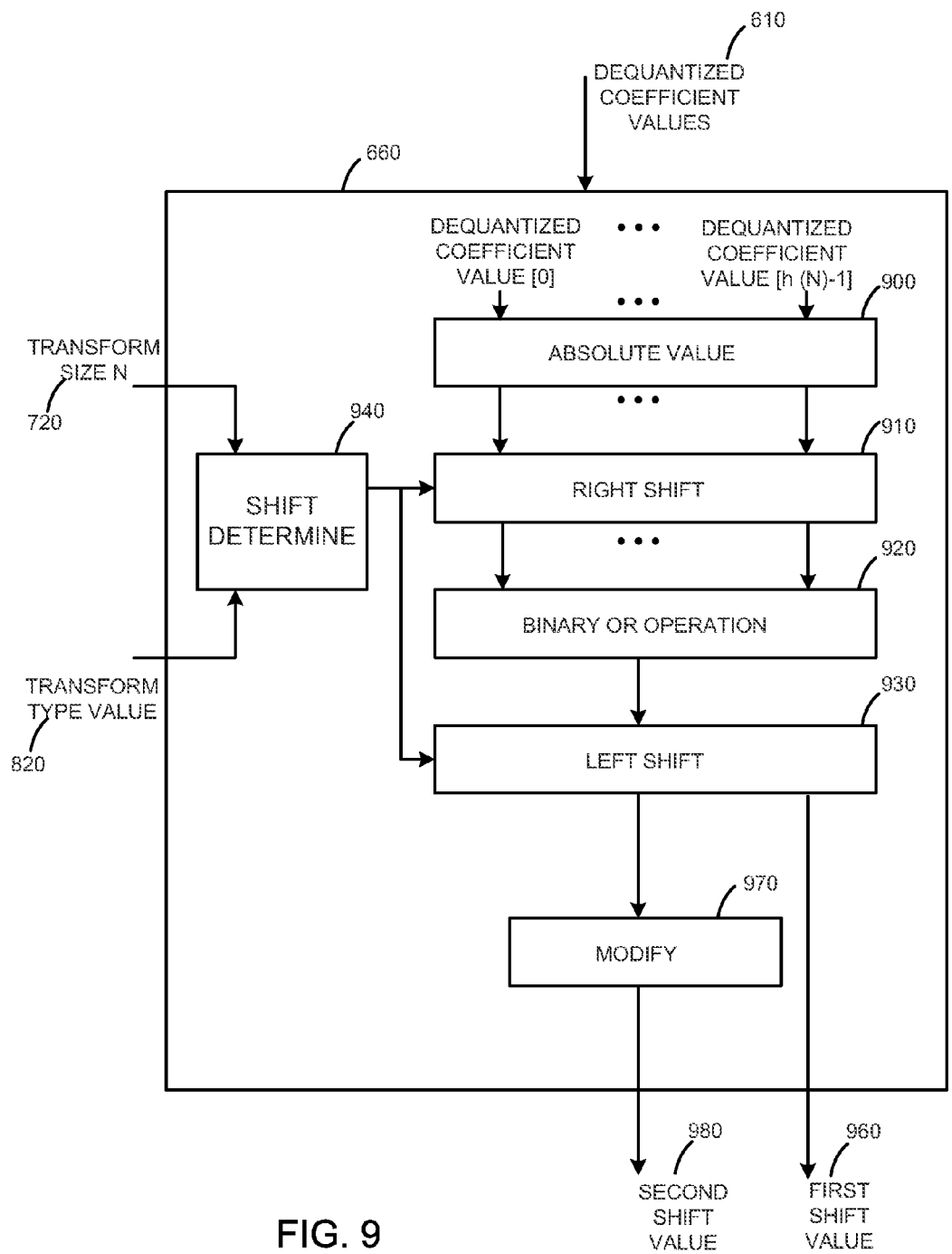
FIG. 9 illustrates yet another exemplary dynamic range prediction.

Referring to FIG. 9, a further exemplary implementation of the dynamic range prediction 660 may include an absolute value process 900 that receives the dequantized coefficient values 610. The absolute value process 900 determines the absolute values of a dequantized coefficient value, where dequantized coefficient value[D], is the $D^{th}$ dequantized coefficient value in a set of dequantized coefficient values. A set of operations including a right shift 910, a binary OR operation 920, and a left shift 930, collectively determine a maximum value of the set of dequantized coefficient values 610. The set of right shift 910 and left shift 930, collectively are controlled by a shift determine process 940. The shift determine process 940 receives the transform size N 720 and the transform type value 820 which is used to select the amount of the right shift 910 and the left shift 930. The result of the left shift 930 is a third shift value 955, that is provided to a look up table 990, which then provides a first shift value 960 to the dynamic range compensation 650. The output of the look up table 990 is modified 970 to provide a second shift value 980 that is provided to the post compensation 690. The determination of shift values may be implemented in the form of one or more look up tables.

Figure 10:
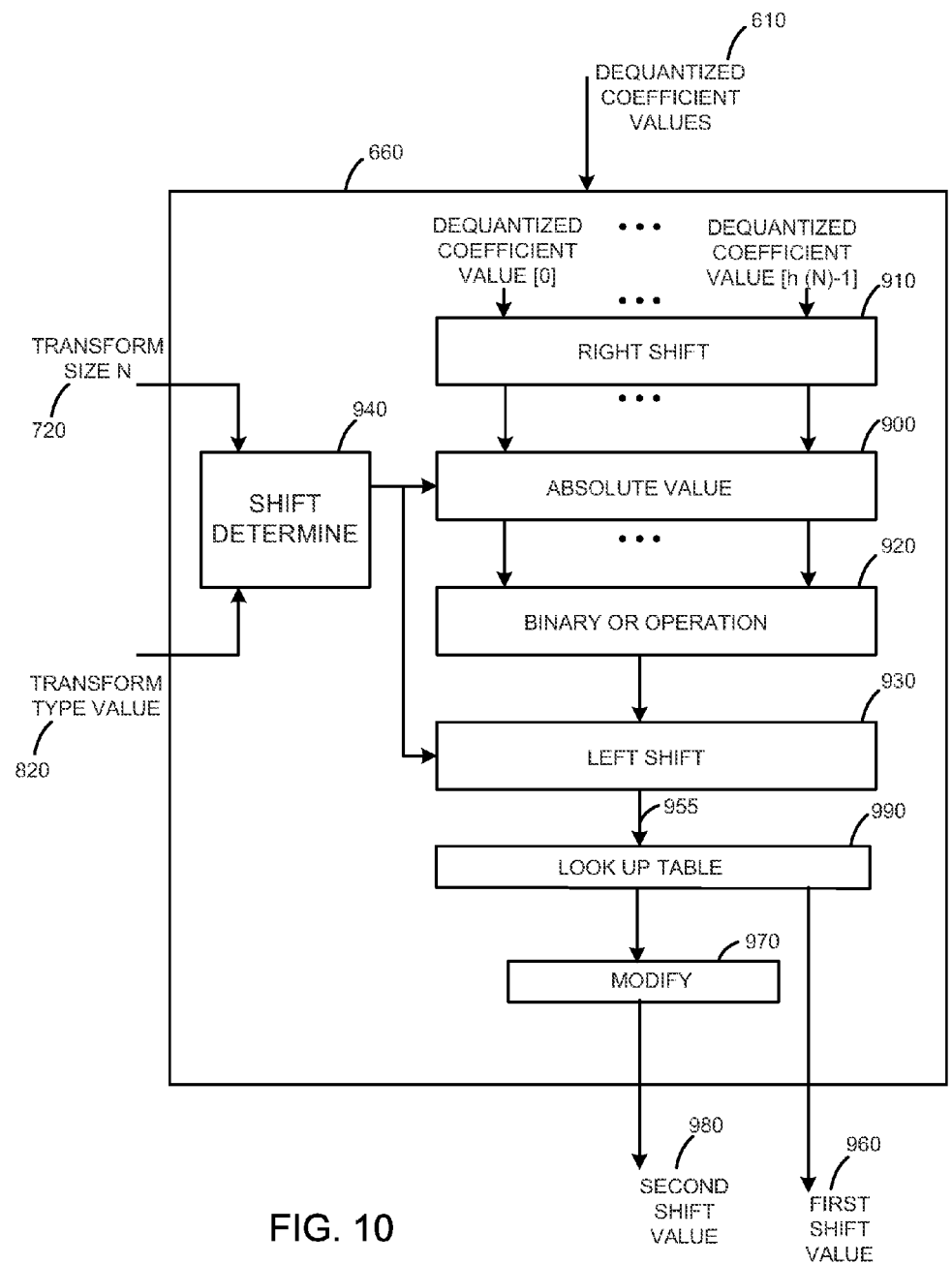
FIG. 10 illustrates yet a further exemplary dynamic range prediction.

Referring to FIG. 10, another modified exemplary implementation is similar to that shown in FIG. 9, with the right shift 910 and the absolute value 900 being switched with one another, and modified as necessary.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

We claim:

1. A method for decoding video comprising:
   (a) receiving quantized coefficients representative of a block of video representative of a plurality of pixels;
   (b) dequantizing said quantized coefficients to generate dequantized coefficients having a first bit depth being transform coefficients;
   (c) subsequent to said dequantizing inverse transforming said dequantized coefficients said being transform coefficients having said first bit depth using a first one dimensional inverse transform to a result having a second bit depth and subsequently inverse transforming said result having a third bit depth using a second one dimensional inverse transform to determine a decoded residue having a fourth bit depth;
   (d) wherein said result of said first one-dimensional inverse transform having said second bit depth are shifted different amounts having said second bit depth to said third bit depth different than said second bit depth using a shifting process based upon the magnitude of said dequantized coefficients and a transform size parameter.

2. The method of claim 1 wherein said shifting process is based upon the height and width of said transform size parameter.

3. The method of claim 1 wherein said shifting process uses a larger value for a larger said magnitude of said dequantized coefficients and a smaller value for a smaller said magnitude of said dequantized coefficients.

4. The method of claim 1 wherein said shifting process uses at least three different said amounts.

5. The method of claim 4 wherein said shifting process uses at least four said different amounts.

6. The method of claim 5 wherein said shifting process uses at least fives said different amounts.

7. The method of claim 1 wherein said magnitude is a maximum value of a respective block of said video.

\* \* \* \* \*